United States Patent
Chun

(10) Patent No.: US 12,176,568 B2
(45) Date of Patent: *Dec. 24, 2024

(54) CYLINDRICAL LITHIUM ION SECONDARY BATTERY

(71) Applicant: Samsung SDI Co., Ltd., Yongin-si (KR)

(72) Inventor: Byoung Min Chun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/490,635

(22) Filed: Oct. 19, 2023

(65) Prior Publication Data

US 2024/0047817 A1 Feb. 8, 2024

Related U.S. Application Data

(63) Continuation of application No. 16/965,258, filed as application No. PCT/KR2019/000047 on Jan. 2, 2019, now Pat. No. 11,855,303.

(30) Foreign Application Priority Data

Feb. 1, 2018 (KR) .................. 10-2018-0012754

(51) Int. Cl.
*H01M 50/342* (2021.01)
*H01M 10/0525* (2010.01)
(Continued)

(52) U.S. Cl.
CPC ... *H01M 50/3425* (2021.01); *H01M 10/0525* (2013.01); *H01M 50/107* (2021.01); *H01M 10/0587* (2013.01); *H01M 2200/20* (2013.01)

(58) Field of Classification Search
CPC ............ H01M 50/3425; H01M 50/10; H01M 10/0525; H01M 10/0587; H01M 2200/20; H01M 50/107
See application file for complete search history.

(56) References Cited

U.S. PATENT DOCUMENTS

| 4,175,166 A | 11/1979 | Rosansky |
| 4,576,303 A | 3/1986 | Mundt et al. |

(Continued)

FOREIGN PATENT DOCUMENTS

| CN | 1848481 A | 10/2006 |
| CN | 103579535 A | 2/2014 |

(Continued)

OTHER PUBLICATIONS

Chinese Notice of Allowance for Chinese Patent Application No. 201980017037.6 dated Jan. 20, 2023, 6 pages and English translation, 5 pages.

(Continued)

*Primary Examiner* — Christopher P Domone
*Assistant Examiner* — Jonathan William Estes
(74) *Attorney, Agent, or Firm* — Lewis Roca Rothgerber Christie LLP

(57) ABSTRACT

An embodiment of the present invention relates to a cylindrical lithium ion secondary battery. The technical problem to be solved is to provide a cylindrical lithium ion secondary battery which is designed such that a safety vent is formed and at the same time or afterwards excess metal can be guided to a curved portion adjacent to the safety vent, thereby enhancing the flatness of a can floor and reducing damage to the safety vent. To this end, the present invention provides a cylindrical lithium ion secondary battery comprising: a cylindrical can; an electrode assembly accommodated in the cylindrical can; and a cap assembly for sealing (Continued)

the cylindrical can, wherein the cylindrical can comprises a circular floor portion, a curved portion curved from the floor portion towards the electrode assembly, and a safety vent formed on the curved portion.

9 Claims, 9 Drawing Sheets

(51) Int. Cl.
*H01M 10/0587* (2010.01)
*H01M 50/107* (2021.01)

(56) References Cited

U.S. PATENT DOCUMENTS

| | | | |
|---|---|---|---|
| 4,610,370 A | 9/1986 | Patterson et al. | |
| 4,698,282 A | 10/1987 | Mantello | |
| 4,842,965 A | 6/1989 | Urushiwara et al. | |
| 4,987,520 A * | 1/1991 | Rots | H01G 9/12 361/521 |
| 5,042,675 A * | 8/1991 | Patterson | H01M 50/3425 429/82 |
| 6,265,101 B1 | 7/2001 | Tucholski | |
| 6,670,073 B2 | 12/2003 | Tucholski et al. | |
| 8,668,998 B2 | 3/2014 | Guen | |
| 8,945,740 B2 | 2/2015 | Fuhr et al. | |
| 8,974,931 B2 | 3/2015 | Kim | |
| 9,287,539 B2 | 3/2016 | Sode et al. | |
| 10,109,842 B2 | 10/2018 | Ahn et al. | |
| 10,115,946 B2 | 10/2018 | Guen | |
| 10,535,860 B2 | 1/2020 | Fujiwara et al. | |
| 10,622,608 B2 | 4/2020 | Ko et al. | |
| 11,855,303 B2 * | 12/2023 | Chun | H01M 50/107 |
| 2002/0031705 A1 | 3/2002 | Tucholski | |
| 2003/0077505 A1 | 4/2003 | Goda et al. | |
| 2004/0157115 A1 | 8/2004 | Bouffard et al. | |
| 2007/0148533 A1 | 6/2007 | Anglin et al. | |
| 2007/0154782 A1 * | 7/2007 | Cho | H01M 50/133 429/175 |
| 2012/0077062 A1 | 3/2012 | Fuhr et al. | |
| 2012/0196160 A1 | 8/2012 | Guen | |
| 2013/0209843 A1 | 8/2013 | Ito et al. | |
| 2014/0045000 A1 | 2/2014 | Kim | |
| 2014/0054000 A1 * | 2/2014 | Kitamura | B22D 18/02 164/319 |
| 2015/0118531 A1 | 4/2015 | Kondo et al. | |
| 2015/0364736 A1 | 12/2015 | Ito et al. | |
| 2016/0149179 A1 | 5/2016 | Sode et al. | |
| 2017/0077485 A1 | 3/2017 | Fujiwara et al. | |
| 2017/0098808 A1 | 4/2017 | Guen | |
| 2017/0110711 A1 | 4/2017 | Ahn et al. | |
| 2017/0309880 A1 | 10/2017 | Ko et al. | |

FOREIGN PATENT DOCUMENTS

| | | | | |
|---|---|---|---|---|
| CN | 106549129 A | 3/2017 | | |
| CN | 106601976 A | 4/2017 | | |
| CN | 107305931 A | 10/2017 | | |
| CN | 107579173 A | 1/2018 | | |
| EP | 0 354 607 B1 | 5/1995 | | |
| EP | 1119060 A2 * | 7/2001 | | H01M 2/1241 |
| GB | 1541029 | 2/1979 | | |
| JP | H10-162798 A | 6/1998 | | |
| JP | 2001-102023 A | 4/2001 | | |
| JP | 4121130 B2 | 7/2008 | | |
| JP | 2012-155852 A | 8/2012 | | |
| JP | 2015-015098 A | 1/2015 | | |
| JP | 2016-157570 A | 9/2016 | | |
| KR | 10-2012-0124687 A | 11/2012 | | |
| KR | 10-1222215 B1 | 1/2013 | | |
| KR | 10-2013-0054310 A | 5/2013 | | |
| KR | 10-2014-0020482 A | 2/2014 | | |
| KR | 10-2017-0039932 A | 4/2017 | | |
| WO | WO 00/11732 A1 | 3/2000 | | |
| WO | WO 2010/120906 A2 | 10/2010 | | |
| WO | WO 2014/126408 A1 | 8/2014 | | |

OTHER PUBLICATIONS

EPO Extended European Search Report dated Mar. 25, 2022, issued in corresponding European Patent Application No. 19746824.2 (13 pages).

EPO Partial Supplementary European Search Report dated Sep. 29, 2021, issued in corresponding European Patent Application No. 19746824.2 (15 pages).

* cited by examiner

CYLINDRICAL LITHIUM ION SECONDARY BATTERY

CROSS-REFERENCE TO RELATED APPLICATION(S)

This application is a continuation of U.S. patent application Ser. No. 16/965,258, filed Jul. 27, 2020, which is a National Phase Patent Application of International Patent Application Number PCT/KR2019/000047, filed on Jan. 2, 2019, which claims priority of Korean Patent Application No. 10-2018-0012754, filed Feb. 1, 2018. The entire contents of each of which are incorporated herein by reference.

TECHNICAL FIELD

An embodiment of the present invention relates to a cylindrical lithium ion secondary battery.

BACKGROUND ART

Lithium ion secondary batteries are being widely used in portable electronic devices and power sources of hybrid automobiles or electric vehicles because of various advantages, including a high operation voltage, a high energy density per unit weight, and so forth.

The lithium ion secondary battery can be largely classified as cylinder type secondary battery, a prismatic type secondary battery, a pouch type secondary battery. Specifically, the cylindrical lithium ion secondary battery generally includes a cylindrical electrode assembly, a cylindrical can coupled to the electrode assembly, an electrolyte injected into the can to allow movement of lithium ions, and a cap assembly coupled to one side of the can to prevent leakage of the electrolyte and separation of the electrode assembly.

The above information disclosed in this Background section is only for enhancement of understanding of the background of the described technology and therefore it may contain information that does not form the prior art that is already known in this country to a person of ordinary skill in the art.

DESCRIPTION OF EMBODIMENTS

Technical Problem

An embodiment of the present invention provides a cylindrical lithium ion secondary battery which is designed such that a safety vent is formed and at the same time or afterwards excess metal can be guided to a curved portion adjacent to the safety vent, thereby enhancing the flatness of a can floor and reducing damage to the safety vent.

Solution to Problem

Provided is a cylindrical lithium ion secondary battery embodiment of the present invention including: a cylindrical can; an electrode assembly accommodated in the cylindrical can; and a cap assembly for sealing the cylindrical can, wherein the cylindrical can comprises a circular floor portion, a curved portion curved from the floor portion towards the electrode assembly, and a safety vent formed on the curved portion.

The curved portion and the safety vent may have a circular ring shape.

The curved portion may include a pair of curve portions curved from the floor portion toward the electrode assembly and a flat portion connecting the pair of curve portions, and the safety vent may include a pair of slope portions sloping from the flat portion toward the electrode assembly and a planar portion connecting the pair of slope portions.

The curved portion may have a depth ranging from 0.1 mm to 0.15 mm, and the safety vent may have a thickness ranging from 0.05 mm to 0.2 mm.

The curved portion may have a depth ranging from 0.1 mm to 0.13 mm, and the safety vent may have a thickness ranging from 0.075 mm to 0.105 mm.

The safety vent may have a volume ranging from 0.49 mm$^3$ to 0.31 mm$^3$, and the curved portion may have a volume ranging from 0.3 mm$^3$ to 0.75 mm$^3$.

A resin plate melted at a temperature of 100° C. to 300° C. may be attached to the curved portion to cover the safety vent.

A space may be provided between the safety vent and the resin plate.

A resin layer melted at a temperature of 100° C. to 300° C. may be coated on the safety vent.

Advantageous Effects of Invention

As described above, the embodiment of the present invention provides a cylindrical lithium ion secondary battery which is designed such that a safety vent is formed and at the same time or afterwards excess metal can be guided to a curved portion adjacent to the safety vent, thereby enhancing the flatness of a can floor and reducing damage to the safety vent. That is, in the embodiment of the present invention, in addition to the safety vent, the curved portion curved from the can floor toward the electrode assembly is further formed on the can floor, and thus excess metal pushed away when the safety vent is formed may move to the curved portion, thereby enhancing the flatness of the can floor. As described above, if the flatness of the can floor is enhanced, dimension errors may be reduced in subsequent processes such as beading and crimping processes. Accordingly, badness due to a dimensional distribution of secondary batteries is generally lowered.

In addition, according to embodiments of the present invention, the flatness of the can floor can be enhanced, thereby reducing the distribution of welding strengths of the tab welded to the can floor. This may lead to dimensional stability during welding and arrangement of elements in the course of battery manufacturing, thereby reducing a variety of badness factors.

In addition, according to embodiments of the present invention, the safety vent may be covered by attaching a resin plate to the surface of the curved portion, or a resin layer may be directly coated on the surface of the safety vent, thereby preventing the surface of the safety vent exposed to the exterior of the coating from being oxidized or damaged when the safety vent is formed. When the temperature of the secondary battery increases to exceed a predetermined temperature, the resin plate or the resin layer may be melted, so that the operation of the safety vent may not be hampered.

MODE OF DISCLOSURE

Figure 1A:
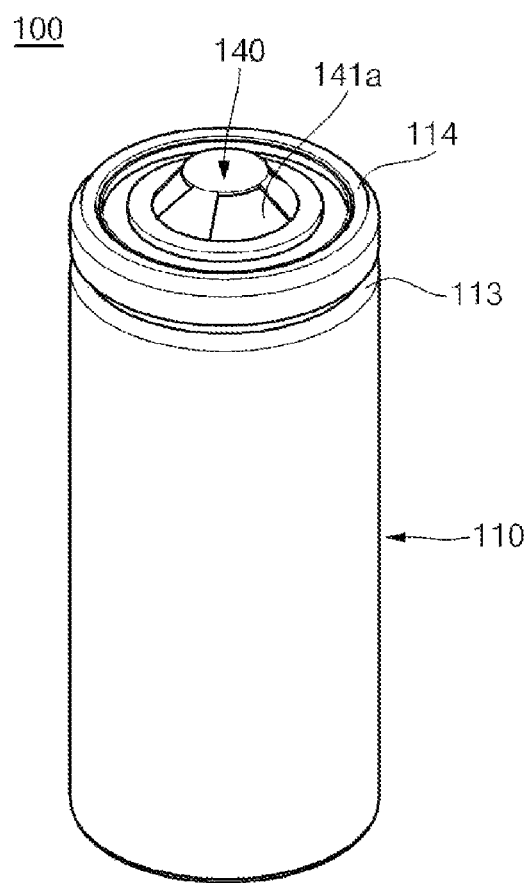
FIGS. 1A, 1B and 1C are a perspective view, a cross-sectional view and an exploded perspective view of a cylindrical lithium ion secondary battery according to an embodiment.

Hereinafter, example embodiments of the present invention will be described in detail.

Various embodiments of the present invention may be embodied in many different forms and should not be construed as being limited to the example embodiments set forth herein. Rather, these example embodiments of the invention are provided so that this invention will be thorough and complete and will convey inventive concepts of the invention to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present invention.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the element or feature in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Figure 1B:
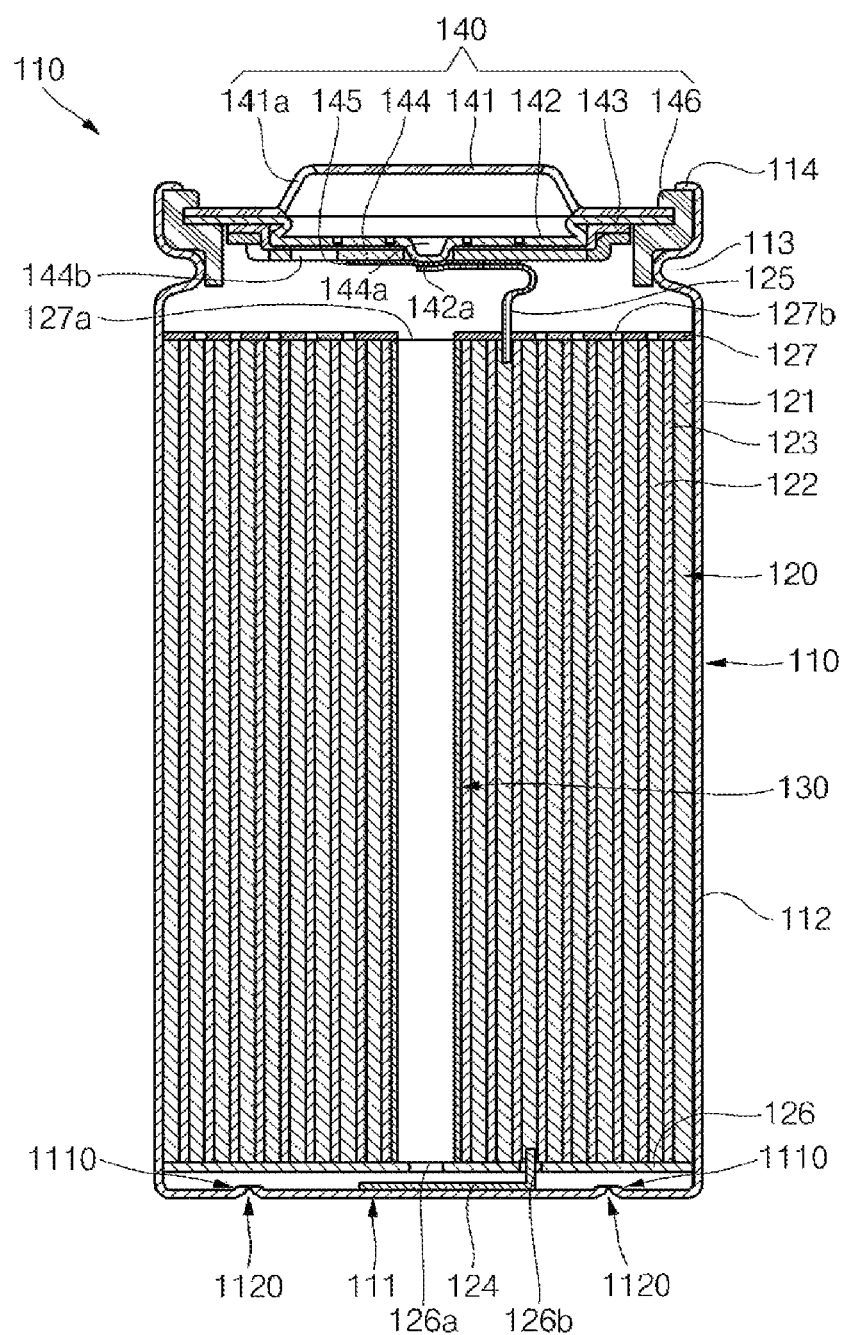
Figure 1C:
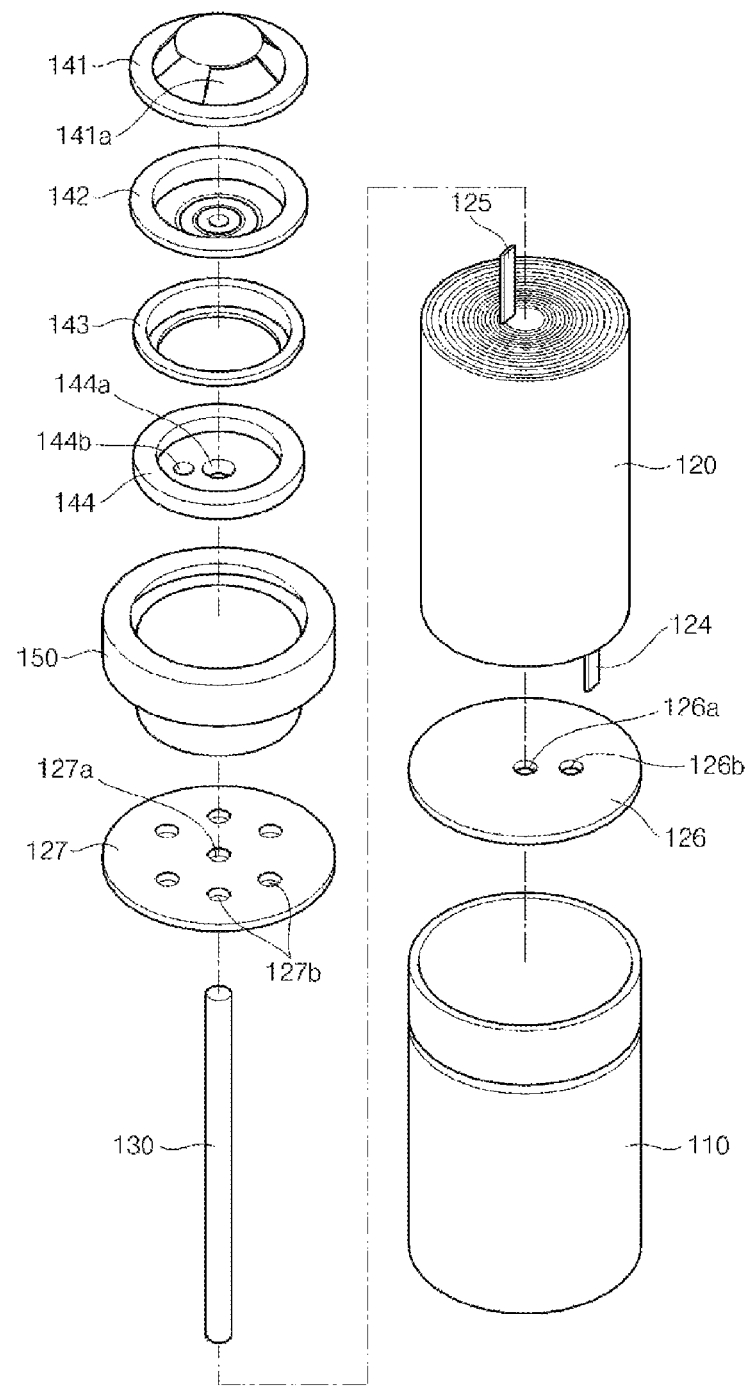

FIGS. 1A, 1B and 1C are a perspective view, a cross-sectional view and an exploded perspective view of a cylindrical lithium ion secondary battery according to an embodiment.

As shown in FIGS. 1A to 1C, the cylindrical lithium ion secondary battery 100 according to an embodiment may include a cylindrical can 110, an electrode assembly 120, and a cap assembly 140. In addition, the cylindrical lithium ion secondary battery 100 may further include a center pin 130 coupled to the electrode assembly 120.

The cylindrical can 110 may include a circular floor portion 111 and a side portion 112 upwardly extending by a predetermined length from the floor portion 111. In the course of manufacturing the secondary battery, a top portion of the cylindrical can 110 may be opened. Thus, during assembling of the secondary battery, the electrode assembly 120 and the center pin 130 may be inserted into the cylindrical can 110 together with an electrolyte. The cylindrical can 110 may be made of, for example, steel, nickel plated steel, stainless steel, aluminum, or an aluminum alloy, but embodiments of the present invention are not limited thereto. The cylindrical can 110 may include an inwardly recessed beading part 113 formed at a lower portion of the cap assembly 140 to prevent the cap assembly 140 from being deviated to the outside, and an inwardly bent crimping part 114 formed at an upper portion of the cap assembly 140.

Meanwhile, the cylindrical can 110 may include on its floor portion a curved portion 1110 curved from the floor portion 111 towards the electrode assembly 120, and a safety vent 1120 formed on the curved portion 1110 thinner than the floor portion 111 formed on the curved portion 1110. The curved portion 1110 allows excess metal to be guided to the curved portion 1110 adjacent to the safety vent 1120, thereby enhancing the flatness of the floor portion 111 and reducing damage or cracking to the safety vent 1120. The safety vent 1120 is ruptured when the internal pressure of the cylindrical can 110 abnormally rises, to then the internal gas to be discharged. The curved portion 1110 and the safety vent 1120 will later be described in further details.

The electrode assembly 120 may be accommodated in the cylindrical can 110. The electrode assembly 120 may include a negative electrode plate 121 coated with a negative electrode active material (e.g., graphite or carbon), a positive electrode plate 122 coated with a positive electrode active material (e.g., a transition metal oxide, such as $LiCoO_2$, $LiNiO_2$, or $LiMn_2O_4$), and a separator 123 positioned between the negative electrode plate 121 and the positive electrode plate 122 to prevent an electric short and allowing only movement of lithium ions. The negative electrode plate 121, the positive electrode plate 122 and the separator 123 may be wound up in a substantially cylindrical shape. In an example embodiment, the negative electrode plate 121 may be made of a copper (Cu) foil, and the positive electrode plate 122 may be made of an aluminum (Al) foil, and the separator 123 may be made of polyethylene (PE) or polypropylene (PP), but embodiments of the present invention are not limited thereto. In addition, a negative electrode tab 124 projected downwardly and extending with a predetermined length may be welded to the negative electrode plate 121 and a positive electrode tab 125 projected upwardly with a predetermined length may be welded to the positive electrode plate 122, and vice versa. Additionally, the negative electrode tab 124 may be made of nickel (Ni) and the positive electrode tab 125 may be made of aluminum (Al), but embodiments of the present invention are not limited thereto.

In addition, the negative electrode tab 124 of the electrode assembly 120 may be welded to the floor portion 111 of the cylindrical can 110, and the cylindrical can 110 may function as a negative electrode. Conversely, the positive electrode tab 125 may be welded to the floor portion 111 of the cylindrical can 110, and the cylindrical can 110 may function as a positive electrode.

A first insulating plate 126 coupled to the cylindrical can 110 and having a first hole 126a formed at its central portion and a second hole 126b formed at its exterior side may be interposed between the electrode assembly 120 and the floor portion 111. The first insulating plate 126 may prevent the electrode assembly 120 from electrically contacting the floor portion 111 of the cylindrical can 110. Specifically, the first insulating plate 126 may prevent the positive electrode plate 122 of the electrode assembly 120 from electrically contacting the floor portion 111. In an example embodiment, when a large amount of gas is generated due to, for example, an abnormality in the secondary battery, the first hole 126a may allow the gas to rapidly move upwardly through the center pin 130, and the second hole 126b may allow the negative electrode tab 124 to pass therethrough to be welded to the floor portion 111.

A second insulating plate 127 coupled to the cylindrical can 110 and having a first hole 127a formed at its central portion and a plurality of second holes 127b formed at its exterior side may be interposed between the electrode assembly 120 and the floor portion 111. The second insulating plate 127 may prevent the electrode assembly 120 from electrically contacting the cap assembly 140. Specifically, the second insulating plate 127 may prevent the negative electrode plate 121 of the electrode assembly 120 from electrically contacting the cap assembly 140. In an example embodiment, when a large amount of gas is generated due to, for example, an abnormality in the secondary battery, the first hole 127a may allow the gas to rapidly move to the cap assembly 140, and the second holes 127b may allow the positive electrode tab 125 to pass through the same to be welded to the cap assembly 140. In an electrolyte injection process, the second holes 127b may allow the electrolyte to rapidly flow into the electrode assembly 120.

Additionally, diameters of the first holes 126a and 127a of the first and second insulating plates 126 and 127 may be smaller than a diameter of the center pin 130, and thus may prevent the center pin 130 from electrically contacting the floor portion 111 of the cylindrical can 110 or the cap assembly 140 due to, for example, an external shock.

The center pin 130 may be in the shape of a hollow cylindrical pipe and may be coupled to a substantially central portion of the electrode assembly 120. The center pin 130 may be made of, for example, steel, stainless steel, aluminum, an aluminum alloy, or polybutylene terephthalate, but embodiments of the present invention are not limited thereto. The center pin 130 may prevent the electrode assembly 120 from being deformed during charging or discharging of the secondary battery, and may serve as a path of gas movement.

The cap assembly 140 may include a cap-up 141 having a plurality of through-holes 141a, a safety plate 142 formed under the cap-up 141, an insulating plate 143 installed under the safety plate 142, a cap-down 144 installed under the safety plate 143 and having first and second through-holes 144a and 144b, a sub-plate 145 fixed on a bottom surface of the cap-down 144 and electrically connected to the positive electrode tab 125, and an insulation gasket 146 insulating the cap-up 141, the safety plate 142, the insulating plate 143, the cap-down 144 and a side portion 112 of the cylindrical can 110. In an example embodiment, the insulation gasket 146 may be compressed between the beading part 113 formed on the side portion 112 of the cylindrical can 110 and the crimping part 114. The through-holes 141a, 144a, and 144b formed in the cap-up 141 and the cap-down 144 may discharge internal gas to the exterior side of the cylindrical can 110 when an abnormal internal pressure is generated in the cylindrical can 110. The internal pressure may make the safety plate 142 upwardly reversed and electrically separated from the sub-plate 145. Then, the safety plate 142 may be ruptured and the internal gas may be discharged to the exterior side of the can 110.

Additionally, an electrolyte (not shown) may be injected into the cylindrical can 110, and thus lithium ions generated by an electrochemical reaction in the negative electrode plate 121 and the positive electrode plate 122 may move during charging and discharging of the battery. The electrolyte may be a non-aqueous organic electrolyte including a mixture of a lithium salt and high-purity organic solvent. In addition, the electrolyte may be, for example, a polymer using, e.g., including, a solid electrolyte, but embodiments of the present invention are not limited thereto.

Figure 2A:
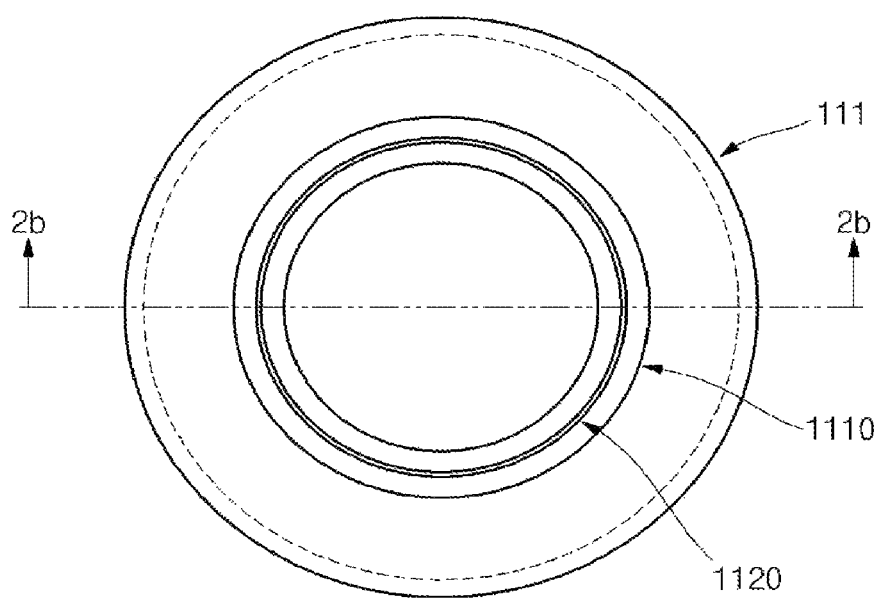
FIG. 2A is a bottom view illustrating a floor portion of a cylindrical can in the cylindrical lithium ion secondary battery according to an embodiment.
Figure 2B:
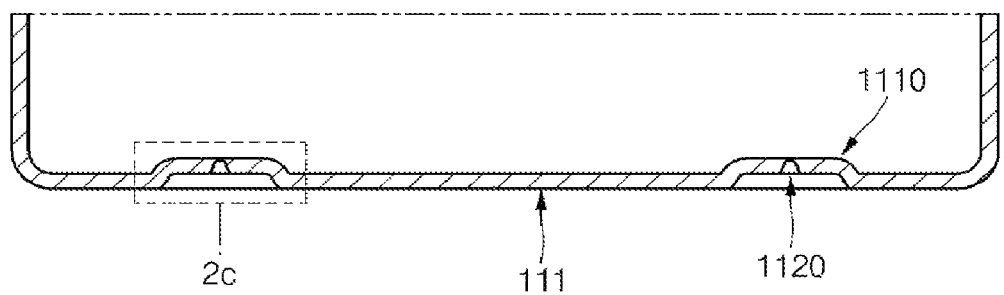
FIG. 2B is a cross-sectional view taken along the line 2b-2b of FIG. 2A.
Figure 2C:
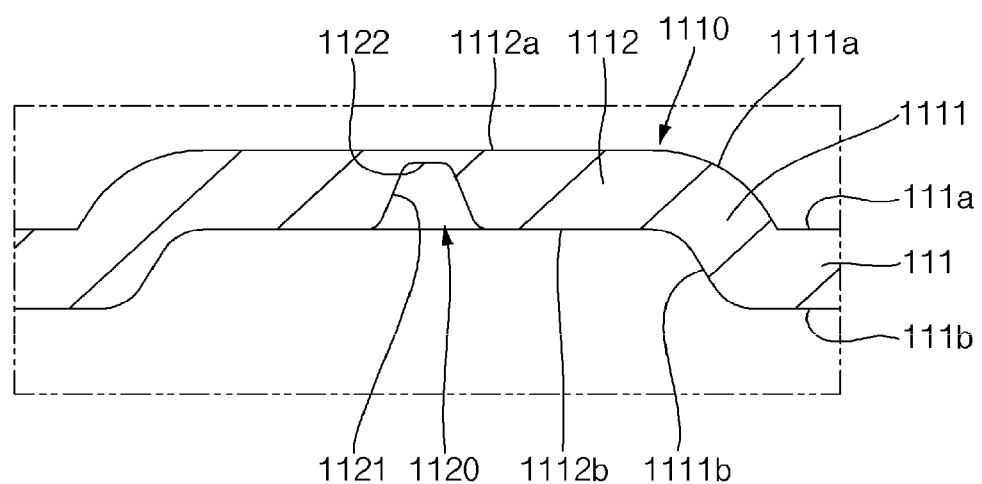
FIG. 2C is an enlarged cross-sectional view illustrating a region 2c.

FIG. 2A is a bottom view illustrating a floor portion 111 of a cylindrical can 110 in the cylindrical lithium ion secondary battery 100 according to an embodiment, FIG. 2B is a cross-sectional view taken along the line 2b-2b of FIG. 2A, and FIG. 2C is an enlarged cross-sectional view illustrating a region 2c.

As shown in FIGS. 2A to 2C, the cylindrical can 110 may include a substantially circular floor portion 111, a curved portion 1110 curved from the floor portion 111 toward the electrode assembly 120, and a safety vent 1120 formed on the curved portion 1110.

In some examples, the curved portion 1110 and the safety vent 1120 located inside the curved portion 1110 may have a substantially circular ring shape.

The floor portion 111 may have a substantially planar first surface 111a and a substantially planar second surface 111b opposite to the first surface 111a. in an example embodiment, a distance between the first surface 111a and the second surface 111b may be defined as a thickness of the floor portion 111.

The curved portion 1110 may include a pair of curve portions 1111 curved from the floor portion 111 toward the electrode assembly 120 and a flat portion 1112 connecting the pair of curve portions 1111. In an example embodiment, each of the curve portions 1111 may also have a substantially curved first surface 1111a and a substantially curved second surface 1111b opposite to the first surface 1111a. In addition, a distance between the first surface 1111a and the second surface 1111b may be defined as a thickness of the curve portion 1111.

The flat portion 1112 may also have a substantially planar first surface 1112a and a substantially planar second surface 1112b opposite to the first surface 1112a. In an example embodiment, a distance between the first surface 1112a and the second surface 1112b may be defined as a thickness of the flat portion 1112. In addition, the floor portion 111 and the curved portion 1110 (including the curve portion 1111 and the flat portion 1112) may have the same thickness. However, in the curved portion 1110, the second surface 1112b of the flat portion 1112 may be positioned between the first surface 111a and the second surface 111b of the floor portion 111 or may be positioned higher than the first surface 111a of the floor portion 111. Additionally, in the curved portion 1110, the second surface 1112b of the flat portion 1112 may be positioned higher than the second surface 111b of the floor portion 111.

The safety vent 1120 may include a pair of slope portions 1121 sloping from the flat portion 1112 of the curved portion 1110 toward the electrode assembly and a planar portion 1122 connecting the pair of slope portions 1121. That is, the slope portions 1121 of the safety vent 1120 are formed to upwardly slope from the second surface 1112b of the flat portion 1112, and the planar portion 1122 of the safety vent 1120 is located between the first surface 1112a and the second surface 1112b of the flat portion 1112. In an example embodiment, a thickness of the safety vent 1120 may be defined by a distance between the planar portion 1122 and the first surface 1112a of the flat portion 1112.

In such a way, in the curved portion 1110 and the safety vent 1120 according to an embodiment, when the curved portion 1110 and the safety vent 1120 are formed using a mold, the volume of metal removed from the safety vent 1120 is absorbed by the curved portion 1110, thereby avoiding warpage of the floor portion 111. That is, when the slope portions 1121 and the planar portion 1122 of the safety vent 1120 are formed, excess metal may be pushed to neighboring areas and the pushed excess metal may be absorbed by the curved portion 1110, thereby maintaining the flatness of the floor portion 111. Here, if the depth of the safety vent 1120 is relatively large, the curved portion 1110 may also have a relatively large depth. In addition, the depth of the safety vent 1120 is relatively small, the curved portion 1110 may also have a relatively small depth.

Figure 3:
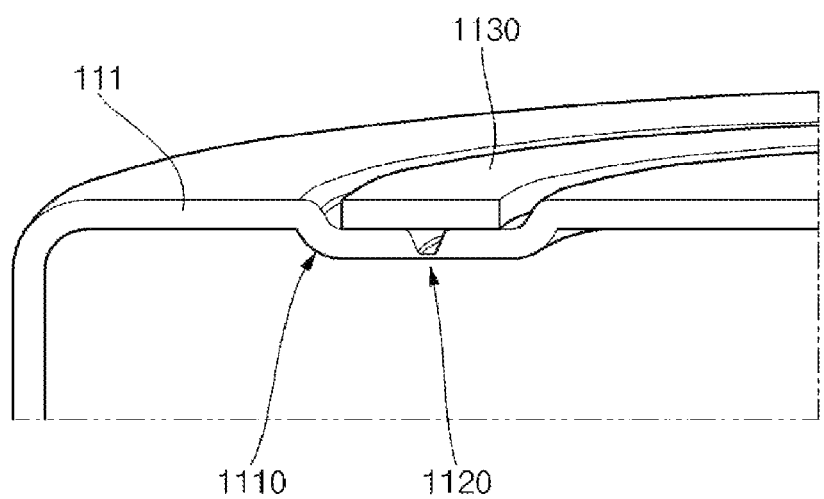
FIG. 3 is a partially enlarged cross-sectional view illustrating an upside-down floor portion of a cylindrical can in the cylindrical lithium ion secondary battery according to another embodiment.

FIG. 3 is a partially enlarged cross-sectional view illustrating an upside-down floor portion 111 of a cylindrical can 110 in the cylindrical lithium ion secondary battery 100 according to another embodiment.

As shown in FIG. 3, a resin plate 1130 melted at a temperature of, for example, about 100° C. to about 300° C. may be attached to the flat portion 1112 (that is, the second surface 1112b of the flat portion 1112) of the curved portion 1110 to cover the safety vent 1120, but embodiments of the present invention are not limited thereto. In some examples, the resin plate 1130 may include polypropylene, polyethylene, or polyterephthalate. In some examples, the resin plate 1130 may have a substantially circular ring shape. In addition, in some examples, since the resin plate 1130 is formed to be substantially flat, a space may be provided between the safety vent 1120 and the resin plate 1130.

In such a way, the resin plate 1130 protects the safety vent 1120 at an operating temperature (for example, 0° C. to 70° C.) of the secondary battery 100 (for example, suppressing rust from being generated at the safety vent 1120). However, if the operating temperature of the secondary battery 100 exceeds about 100° C., the resin plate 1130 is melted, and thus the operation of the safety vent 1120 may not be hampered.

Figure 4:
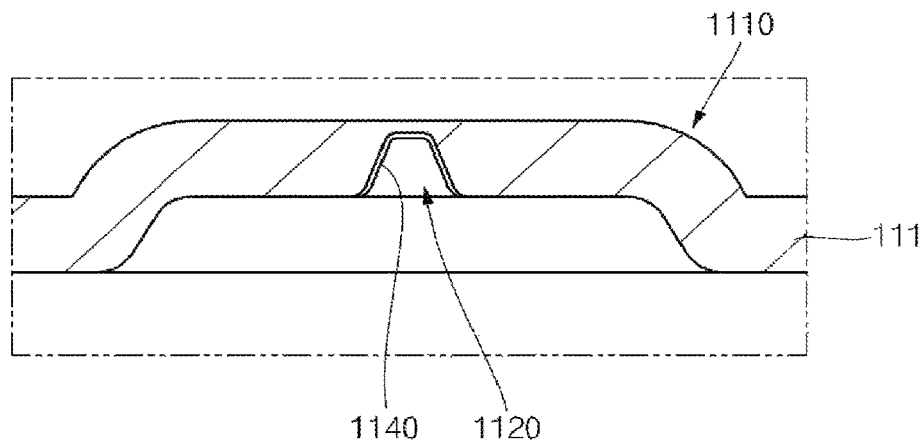
FIG. 4 is a partially enlarged cross-sectional view illustrating an upside-down floor portion of a cylindrical can in the cylindrical lithium ion secondary battery according to another embodiment.

FIG. 4 is a partially enlarged cross-sectional view illustrating an upside-down floor portion 111 of a cylindrical can 110 in the cylindrical lithium ion secondary battery 100 according to another embodiment.

As shown in FIG. 4, a resin layer 1140 melted at a temperature of, for example, about 100° C. to about 300° C. may be coated on the safety vent 1120, that is, on the slope portions 1121 and the planar portion 1122, but embodiments of the present invention are not limited thereto. In some examples, the resin layer 1140 may include polypropylene, polyethylene, or polyterephthalate. In general, if the safety vent 1120 is formed using a mold, a nickel plating located on the surface of the safety vent 1120 is removed to expose steel outside, resulting in rusting on the surface of the safety vent 1120.

However, as described above, rusting may be prevented by forming the resin layer 1140 having a thickness of about 1 μm to about 100 μm on the surface of the safety vent 1120. In addition, the resin layer 1140 protects the safety vent 1120 at the operating temperature of the secondary battery 100, but if the operating temperature of the secondary battery 100 exceeds about 100° C., the resin layer 1140 is melted, and thus the operation of the safety vent 1120 may not be hampered.

Figure 5:
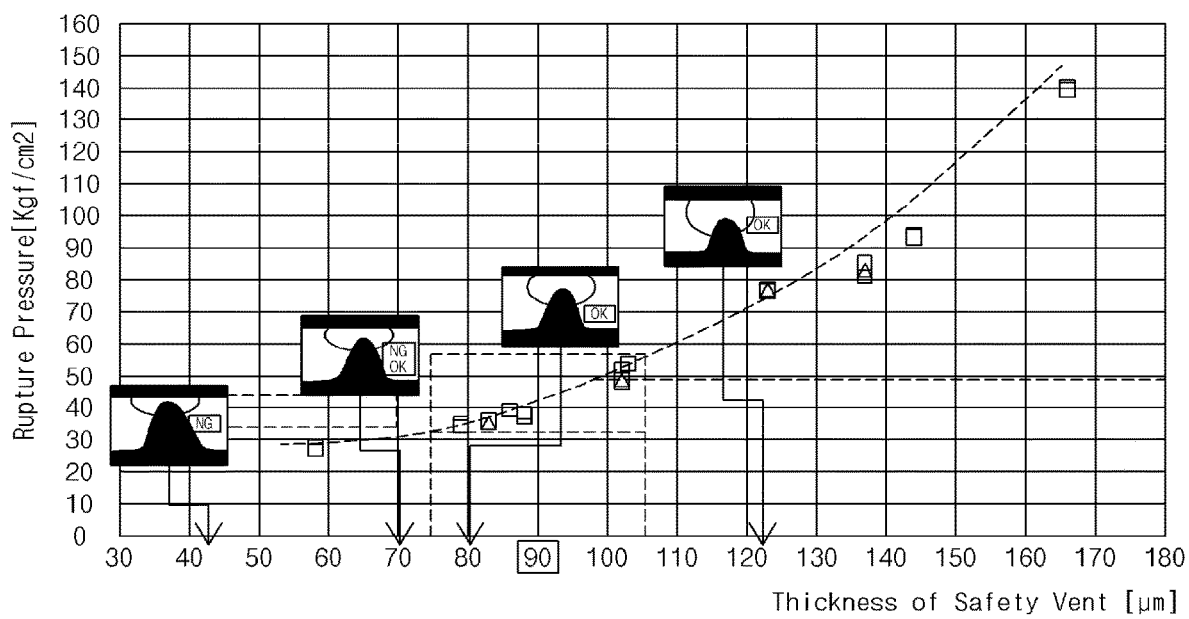
FIG. 5 is a graph showing the relationship between the rupture pressure and the thickness of a safety vent formed on a floor portion of a cylindrical can in a cylindrical lithium ion secondary battery according to an embodiment.

FIG. 5 is a graph showing the relationship between the rupture pressure and the thickness of a safety vent 1120 formed on a floor portion 111 of a cylindrical can 110 in the cylindrical lithium ion secondary battery 100 according to an embodiment. In FIG. 5, the X axis indicates the thickness of the safety vent 1120, and the Y axis indicates the rupture pressure of the safety vent 1120.

As shown in FIG. 5, when the thickness of the safety vent 1120 is about 60 μm, the rupture pressure is about 30 Kgf/cm². When the thickness of the safety vent 1120 is about 80 μm, the rupture pressure is about 35 Kgf/cm². When the thickness of the safety vent 1120 is about 100 μm, the rupture pressure is about 50 Kgf/cm². When the thickness of the safety vent 1120 is about 140 μm, the rupture pressure is about 100 Kgf/cm². That is, as the thickness of the safety vent 1120 increases, the rupture pressure increases. However, when the thickness of the safety vent 1120 is 45 μm or less, the safety vent 1120 may be cracked due to its relatively small thickness during the manufacturing process. When the safety vent 1120 has a thickness of 70 μm or less, there is a probability of the safety vent 1120 being cracked. When the safety vent 1120 has a thickness of 75 μm or greater, the safety vent 1120 is sufficiently thick enough, and there is no risk of the safety vent 1120 being cracked.

Therefore, it is desirable for the safety vent 1120 to have a thickness ranging from about 75 μm to about 105 μm. However, the rupture pressure of the secondary battery 100 should be controlled to be in the range of about 30 Kgf/cm² to about 150 Kgf/cm². Accordingly, the thickness of the safety vent 1120 may be controlled to be in the range of about 50 μm to about 200 μm.

Figure 6A:
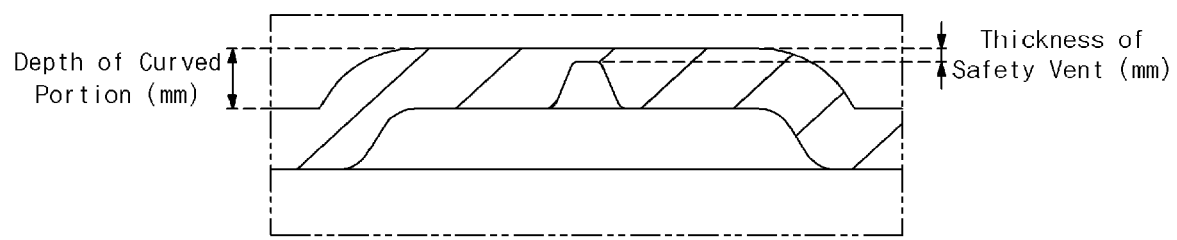
FIG. 6A is a diagram showing the relationship between the depth of a curved portion formed on a floor portion of a cylindrical can and the thickness of a safety vent in the cylindrical lithium ion secondary battery according to an embodiment.
Figure 6B:
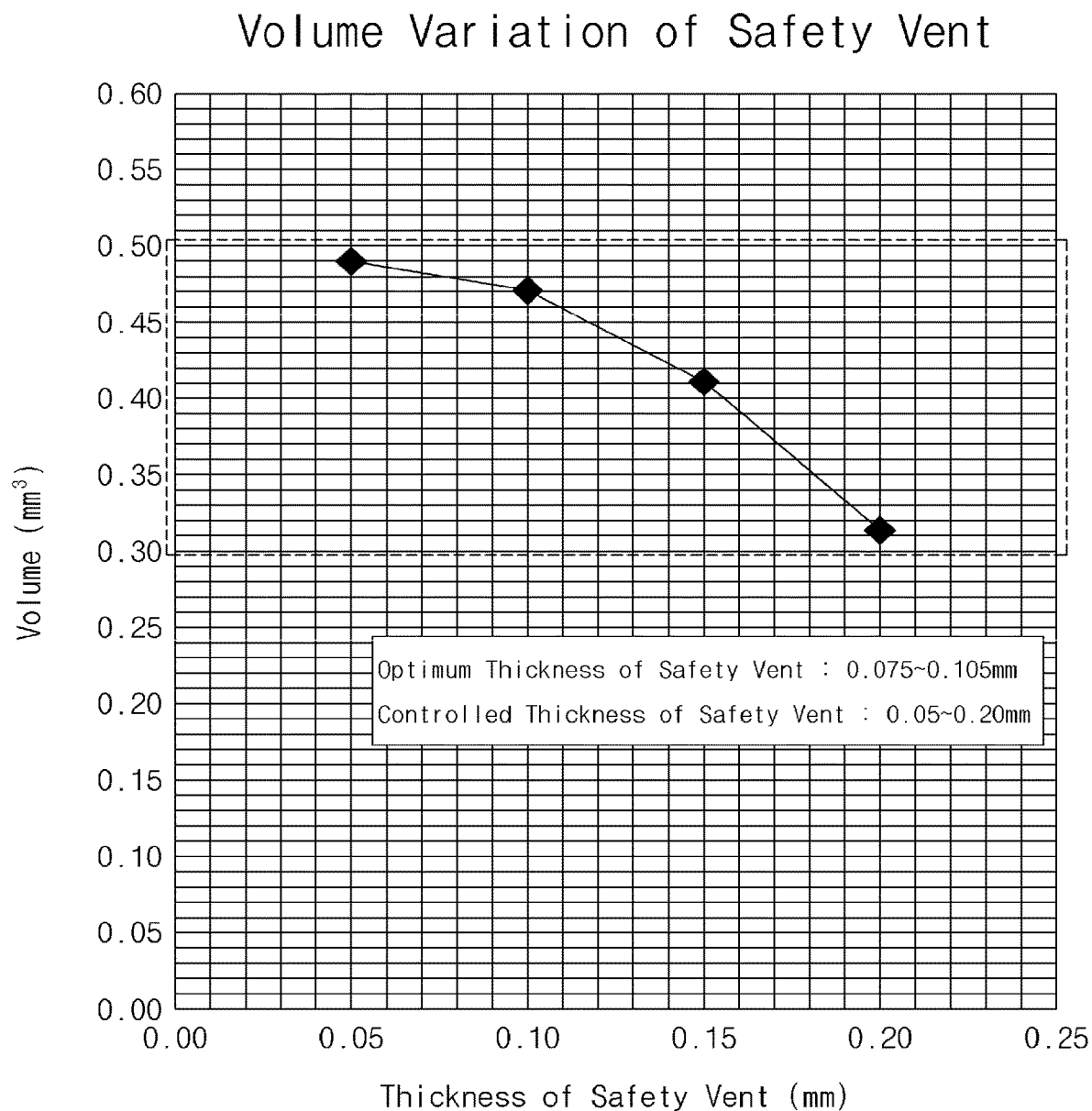
FIGS. 6B and 6C are graphs showing volume variations of the safety vent and the curved portion relative to the thickness of the safety vent and the depth of the curved portion, respectively.
Figure 6C:
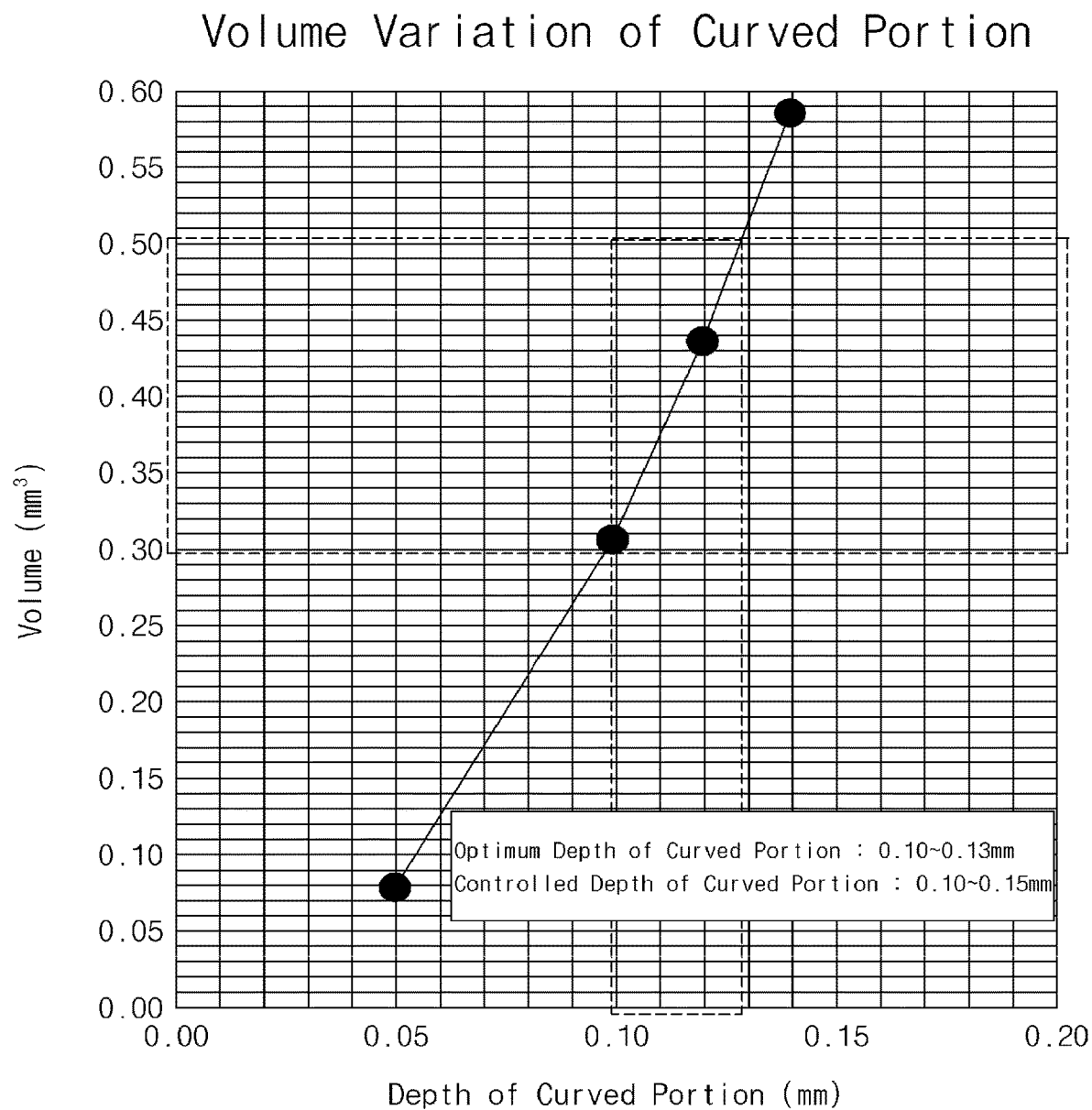

FIG. 6A is a diagram showing the relationship between the depth of a curved portion 1110 formed on a floor portion 111 of a cylindrical can 110 and the thickness of a safety vent 1120 in the cylindrical lithium ion secondary battery 100 according to an embodiment, and FIGS. 6B and 6C are graphs showing volume variations of the safety vent 1120 and the curved portion 1110 relative to the thickness of the safety vent 1120 and the depth of the curved portion 1110, respectively. In FIG. 6B, the X axis indicates the thickness of the safety vent 1120, and the Y axis indicates the spatial volume of the safety vent 1120. In FIG. 6C, the X axis indicates the depth of the curved portion 1110, and the Y axis indicates the spatial volume of the curved portion 1110.

As shown in FIG. 6A, the depth of the curved portion 1110 may be defined as a distance between the second surface 1111b of the floor portion 111 and the first surface 1112a of the flat portion 1112 of the curved portion 1110, and the thickness of the safety vent 1120 may be defined as a distance between the planar portion 1122 of the safety vent 1120 and the first surface 1112a of the flat portion 1112 of the curved portion 1110.

As shown in FIG. 6B, when the thickness of the safety vent 1120 varies (increases) from about 0.05 mm to about 0.20 mm, the spatial volume of the safety vent 1120 varies (decreases) from about 0.49 $mm^3$ to about 0.31 $mm^3$. The experimental result shows that the thickness of the safety vent 1120 may be controlled to be in the range from about 0.05 mm to about 0.20 mm, and the optimum thickness of the safety vent 1120 may range from about 0.075 mm to about 0.105 mm. If the thickness of the safety vent 1120 is smaller than about 0.05 mm, cracking may occur during the manufacturing process. If the thickness of the safety vent 1120 is greater than about 0.20 mm, the rupture pressure may become extremely high.

As shown in FIG. 6C, when the depth of the curved portion 1110 varies (increases) from about 0.05 mm to about 0.14 mm, the spatial volume of the curved portion 1110 varies (decreases) from about 0.08 $mm^3$ to about 0.59 $mm^3$. The experimental result shows that the depth of the curved portion 1110 may be controlled to be in the range from about 0.10 mm to about 0.15 mm, and the optimum depth of the curved portion 1110 may range from about 0.10 mm to about 0.13 mm. If the depth of the curved portion 1110 is smaller than about 0.10 mm, the absorption rate of the metal removed from the safety vent 1120 may be low during the manufacturing process, and the flatness may be lowered. If the depth of the curved portion 1110 is greater than about 0.15 mm, the internal volume of the can 110 may be unduly reduced.

Although the foregoing embodiments have been described to practice the secondary battery of the present invention, these embodiments are set forth for illustrative purposes and do not serve to limit the present invention. Those skilled in the art will readily appreciate that many modifications and variations can be made, without departing from the spirit and scope of the invention as defined in the appended claims, and such modifications and variations are encompassed within the scope and spirit of the present invention.

The invention claimed is:

1. A cylindrical lithium ion secondary battery comprising:
a cylindrical can;
an electrode assembly accommodated in the cylindrical can; and
a cap assembly for sealing the cylindrical can,
wherein the cylindrical can comprises a circular floor portion, a curved portion on the floor portion and curved from the floor portion towards the electrode assembly, and a safety vent formed on the curved portion,
wherein the floor portion, and the curved portion have a same thickness.

2. The cylindrical lithium ion secondary battery of claim 1, wherein the curved portion and the safety vent have a circular ring shape.

3. The cylindrical lithium ion secondary battery of claim 1, wherein the curved portion includes a pair of curve portions curved from the floor portion toward the electrode assembly and a flat portion connecting the pair of curve portions, and the safety vent includes a pair of slope portions sloping from the flat portion toward the electrode assembly and a planar portion connecting the pair of slope portions.

4. The cylindrical lithium ion secondary battery of claim 1, wherein the curved portion has a depth ranging from 0.1 mm to 0.15 mm, and the safety vent has a thickness ranging from 0.05 mm to 0.2 mm.

5. The cylindrical lithium ion secondary battery of claim 1, wherein the curved portion has a depth ranging from 0.1 mm to 0.13 mm, and the safety vent has a thickness ranging from 0.075 mm to 0.105 mm.

6. The cylindrical lithium ion secondary battery of claim 1, wherein the safety vent has a volume ranging from 0.49 $mm^3$ to 0.31 $mm^3$, and the curved portion has a volume ranging from 0.3 $mm^3$ to 0.75 $mm^3$.

7. The cylindrical lithium ion secondary battery of claim 1, wherein a resin plate melted at a temperature of 100° C. to 300° C. is attached to the curved portion to cover the safety vent.

8. The cylindrical lithium ion secondary battery of claim 7, wherein a space is provided between the safety vent and the resin plate.

9. The cylindrical lithium ion secondary battery of claim 1, wherein a resin layer melted at a temperature of 100° C. to 300° C. is coated on the safety vent.

* * * * *